(12) United States Patent
Chan et al.

(10) Patent No.: US 9,977,459 B1
(45) Date of Patent: May 22, 2018

(54) CLOCK GENERATING CIRCUIT AND ASSOCIATED METHOD

(71) Applicant: Elite Semiconductor Memory Technology Inc., Hsinchu (TW)

(72) Inventors: Chin-Tung Chan, New Taipei (TW); Szu-Chun Tsao, Yilan County (TW); Deng-Yao Shih, Changhua County (TW)

(73) Assignee: Elite Semiconductor Memory Technology Inc., Hsinchu (TW)

( * ) Notice: Subject to any disclaimer, the term of this patent is extended or adjusted under 35 U.S.C. 154(b) by 0 days. days.

(21) Appl. No.: 15/484,149

(22) Filed: Apr. 11, 2017

(51) Int. Cl.
*G06F 1/08* (2006.01)
*G04F 5/00* (2006.01)

(52) U.S. Cl.
CPC . *G06F 1/08* (2013.01); *G04F 5/00* (2013.01)

(58) Field of Classification Search
CPC .... G06F 1/08; G04F 5/00; H03K 3/64; H03K 3/78; H03K 3/00; H04B 2215/064; H04B 2215/067; H04B 15/06; H04B 1/707
See application file for complete search history.

(56) References Cited

U.S. PATENT DOCUMENTS

| 6,737,904 B1 * | 5/2004 | Butaud | G06F 1/04 327/298 |
| 8,831,064 B1 * | 9/2014 | Kaviani | H04B 15/04 375/132 |

* cited by examiner

*Primary Examiner* — Jung Kim
(74) *Attorney, Agent, or Firm* — Winston Hsu

(57) ABSTRACT

A clock generating circuit includes: a generating circuit, a reference circuit and an adjusting circuit. The generating circuit generates a clock signal. The reference circuit is coupled to the generating circuit, and generates a reference signal to the generating circuit according to the clock signal, wherein a frequency of the clock signal is varied according to the reference signal when the reference signal is received by the generating circuit. The adjusting circuit generates an adjusting signal and a trigger signal to the generating circuit, wherein the generating circuit refers to the trigger signal to decide whether to adjust the clock signal frequency according to the adjusting signal.

18 Claims, 6 Drawing Sheets

CLOCK GENERATING CIRCUIT AND ASSOCIATED METHOD

BACKGROUND OF THE INVENTION

1. Field of the Invention

The present invention relates to a clock generating circuit, and more particularly, to a spread spectrum clock generating circuit and an associated method.

2. Description of the Prior Art

Many electronic devices employ microprocessors or other digital circuits requiring one or more clock signals for synchronization. A clock signal permits the precise timing of events in the microprocessor. Typical microprocessors may be synchronized by a free-running oscillator, for example being driven by a crystal, an LC-tuned circuit, or an external clock source. The parameters of a clock signal are typically specified for a microprocessor and may include minimum and maximum allowable clock frequencies, tolerances on the high and low voltage levels, maximum rise and fall times on the waveform edges, pulse-width tolerance if the waveform is not a square wave, and the timing relationship between clock phases if two-clock phase signals are needed.

Unfortunately, high-performance microprocessor-based devices using leading-edge high-speed circuits are particularly susceptible to generating and radiating electromagnetic interference (EMI). The spectral components of the EMI emissions typically have peak amplitudes at harmonics of the fundamental frequency of the clock circuit. Other electronic devices, e.g., Class D amplifier, modulate the width of square wave pulses as a function of the input audio signal, also have EMI concerns. Spread spectrum clock generators could prevent EMI from affecting other circuitries in the integrated circuit; however, conventional spread spectrum clock generators cannot effectively achieve this goal.

SUMMARY OF THE INVENTION

One of the objectives of the present invention is to provide a spread spectrum clock generating circuit and an associated method to solve the abovementioned problem.

According to an embodiment of the present invention, a clock generating circuit is disclosed, comprising: a clock generating circuit, a reference circuit and an adjusting circuit. The clock generating circuit is arranged to generate a clock signal. The reference circuit coupled to the clock generating circuit is arranged to generate a reference signal to the clock generating circuit according to the clock signal, wherein a frequency of the clock signal is varied according to the reference signal when the reference signal is received by the clock generating circuit. The adjusting circuit is arranged to generate an adjusting signal and a trigger signal to the clock generating circuit, wherein the clock generating circuit refers to the trigger signal to decide whether to adjust the clock signal frequency according to the adjusting signal.

According to an embodiment of the present invention, a clock generating method is disclosed, comprising: generating a reference signal according to a clock signal, wherein a frequency of the clock signal is varied according to the reference signal; generating an adjusting signal and a trigger signal; and referring to the trigger signal to decide whether to adjust the clock signal frequency according to the adjusting signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
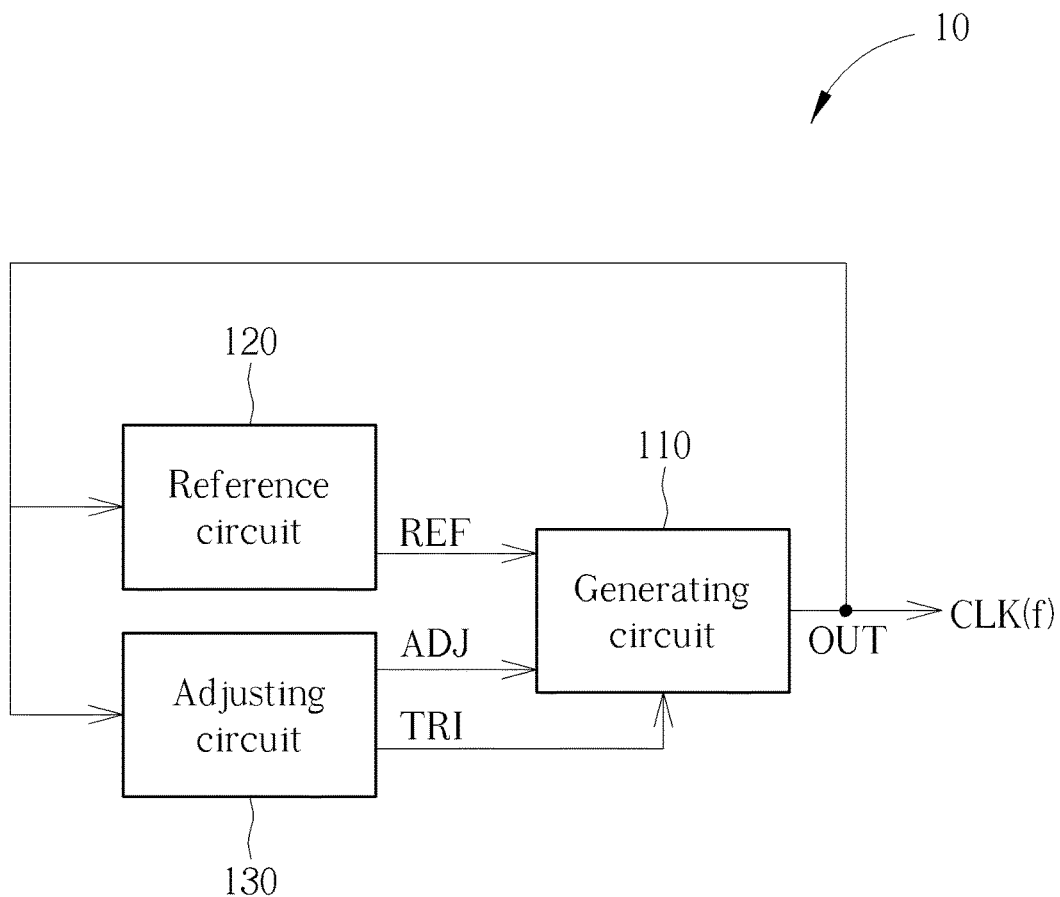
FIG. 1 is a diagram illustrating a clock generating circuit according to an embodiment of the present invention.

FIG. 1 is a diagram illustrating a clock generating circuit 10 according to an embodiment of the present invention. As shown in FIG. 1, the clock generating circuit 10 comprises a generating circuit 110, a reference circuit 120, and an adjusting circuit 130, wherein the generating circuit 110 is arranged to generate a clock signal CLK at an output terminal OUT of the clock generating circuit 10, the reference circuit 120 is arranged to generate a reference signal REF to the generating circuit 110 according to the clock signal CLK, and the adjusting circuit 130 is arranged to generate an adjusting signal ADJ and a trigger signal TRI to the generating circuit 110. When the generating circuit 110 receives the reference signal, a frequency of the clock signal (marked CLK(f)) is varied according to the reference signal REF. In addition, the generating circuit 110 refers to the trigger signal TRI to determine whether to adjust the frequency of the clock signal CLK according to the adjusting signal ADJ.

Figure 2:
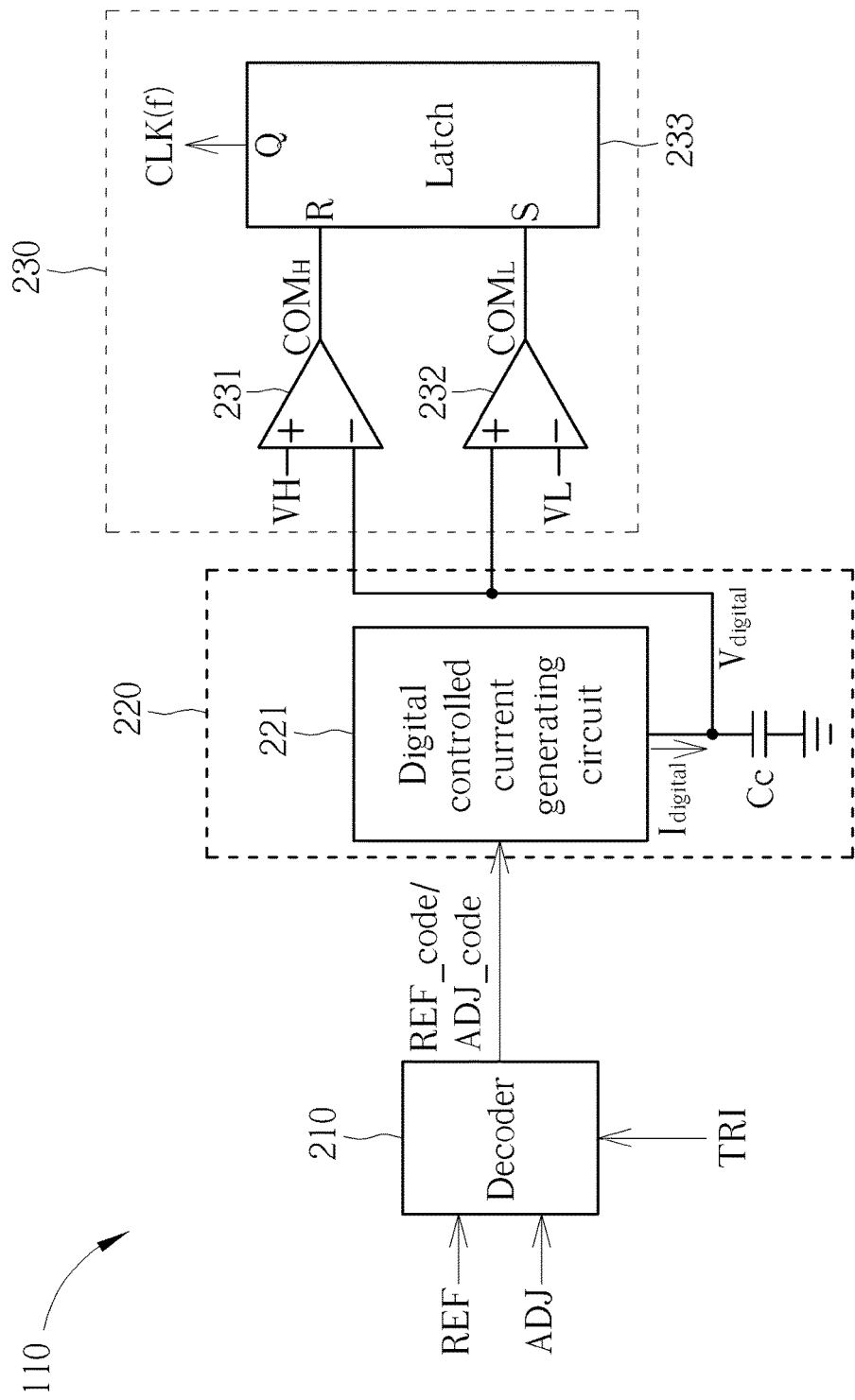
FIG. 2 is a diagram illustrating a generating circuit of the clock generating circuit according to an embodiment of the present invention.

FIG. 2 is a diagram illustrating the generating circuit 110 of the clock generating circuit 10 according to an embodiment of the present invention. As shown in FIG. 2, the generating circuit 110 comprises a decoder 210, a digital controlled voltage generating circuit 220, and a comparing circuit 230. The decoder 210 is arranged to decode the reference signal REF for outputting a reference code REF_code, and further arranged to decode the adjusting signal ADJ for outputting an adjusting code ADJ_code when the trigger signal TRI is a specific value in order to trigger the decoder 210. As shown in FIG. 2, the digital controlled voltage generating circuit 220 comprises a digital controlled current generating circuit 221 and a capacitor Cc, wherein the digital controlled current generating circuit 221 generates a digital controlled current $I_{digital}$ to the capacitor Cc for generating a digital controlled voltage $V_{digital}$. The digital controlled current $I_{digital}$ is generated according to the reference code REF_code or the adjusting code ADJ_code. The comparing circuit 230 comprises comparators 231 and 232 and a latch circuit 233, wherein the comparator 231 and 232 are arranged to compare the digital controlled voltage $V_{digital}$ with a first reference voltage $V_H$ and a second reference voltage $V_L$ to respectively generate comparing results $COM_H$ and $COM_L$ to the latch circuit 233. The latch circuit 233 receives the comparing results $COM_H$ and $COM_L$ to generate the clock signal CLK. The latch circuit 233 is implemented by a SR latch in this embodiment; however, this is only for illustrative purposes and not a limitation of the present invention. Those skilled in the art should readily understand that, as well two comparators and a latch, there are other implementations of generating a clock signal.

Figure 3:
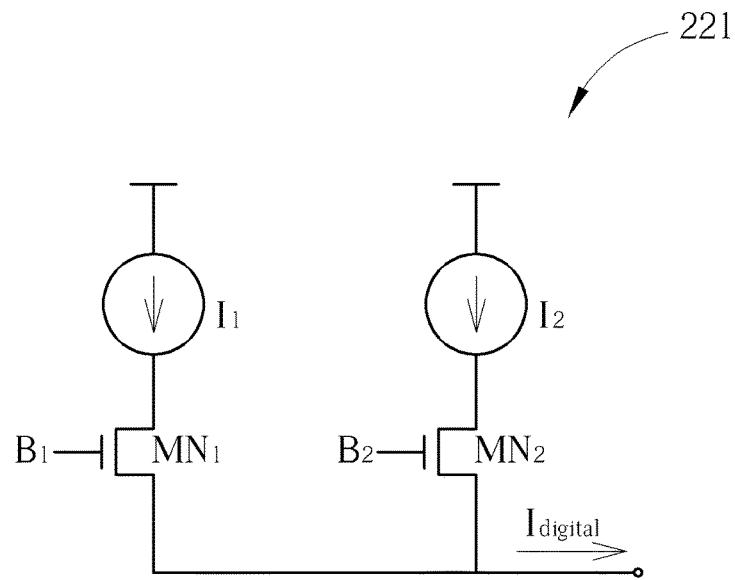
FIG. 3 is diagram illustrating a digital controlled voltage generating circuit of the generating circuit according to an embodiment of the present invention.

FIG. 3 is a diagram illustrating the digital controlled current generating circuit 221 of the generating circuit 110 according to an embodiment of the present invention. In this embodiment, assume that the reference code REF_code and the adjusting code ADJ_code are composed of two bits, and are respectively represented as bits $B_1$ and $B_2$ in FIG. 3. This, however, is not a limitation of the present invention. The digital controlled current generating circuit 221 comprises NMOS transistors MN1 and MN2. As shown in FIG. 3, a gate terminal of the NMOS transistor MN1 is coupled to the bit $B_1$ while a gate terminal of the NMOS transistor MN2 is coupled to the bit B2, a drain terminal of the NMOS transistor MN1 is coupled to a current source I1 while a drain terminal of the NMOS transistor MN2 is coupled to a current source I2, and the digital controlled current is generated from source terminals of the NMOS transistor MN1 and MN2. In this embodiment, a current drained from the current source I1 is I while a current drained from the current source I2 is 2*I. However, the current drained from the current source I2 can be varied with multiple of I. It should be noted that the reference code REF_code or the adjusting code ADJ_code are composed of the bits $B_1$ and $B_2$ in this embodiment. The reference code REF_code or the adjusting code ADJ_code can also be composed of more than two bits in other embodiments. In this case, the digital controlled current generating circuit 221 should comprise more NMOS transistors. Those skilled in the art should readily understand the implementation of the digital controlled current generating circuit 221 when the reference code REF_code and the adjusting code ADJ_code are composed of more than two bits. The detailed description is therefore omitted here for brevity. The bits $B_1$ and $B_2$ are used for determining whether to turn on the NMOS transistors MN1 and MN2, respectively. In other words, the bits $B_1$ and $B_2$ determine the value of the digital controlled current $I_{digital}$ and the digital controlled voltage $V_{digital}$ accordingly. Those skilled in the art should understand that a stronger digital controlled current $I_{digital}$ means the digital controlled voltage $V_{digital}$ will have a higher voltage level which indirectly causes the clock signal CLK to have a higher frequency. More specifically, when a value of the bits B2, B1 generated by the decoder 210 is (0, 0), so that both the NMOS transistors MN1 and MN2 will be turned off, the digital controlled current $I_{digital}$ is at its minimum value causing the clock signal CLK to have a lowest frequency. When values of the bits B2, B1 generated by the decoder 210 are (0, 1), so that only the NMOS transistor MN1 will be turned on, this will cause the frequency of the clock signal CLK to be a bit higher than its lowest value. When values of the bits B2, B1 generated by the decoder 210 are (1, 0), so that only the NMOS transistor MN2 will be turned on, this will cause the frequency of the clock signal CLK to be even higher than its lowest value. When a value of the bits B2, B1 generated by the decoder 210 are (1, 1), so that both the NMOS transistors MN1 and MN2 will be turned on, this will cause the clock signal CLK to have its highest frequency.

Figure 4:
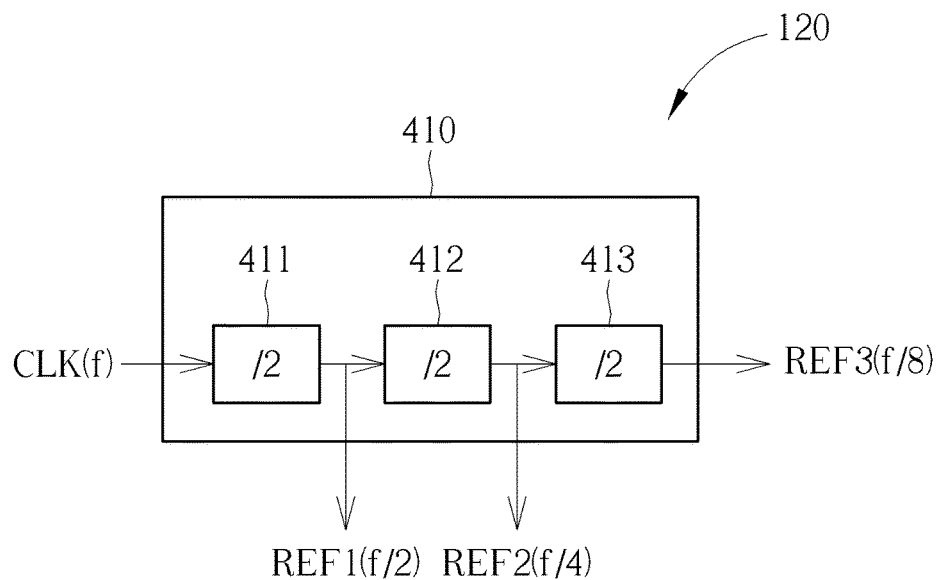
FIG. 4 is a diagram illustrating a reference circuit of the clock generating circuit according to an embodiment of the present invention.

FIG. 4 is a diagram illustrating the reference circuit 120 of the clock generating circuit 10 according to an embodiment of the present invention. As shown in FIG. 4, the reference circuit 120 comprises a frequency dividing circuit 410, wherein the frequency dividing circuit 410 performs a frequency division on the clock signal CLK to generate the reference signal REF. The reference signal REF is composed of a first reference signal REF1, a second reference signal REF2 and a third reference signal REF3. The frequency dividing circuit comprises frequency dividers 411, 412 and 413, all having frequency dividing factors of 2, which generate the first reference signal REF1, the second reference signal REF2 and the third reference signal REF3. The frequency of the first reference signal REF1 is half the frequency of the clock signal CLK (marked as f/2), the frequency of the second reference signal REF2 is a quarter of the frequency of the clock signal CLK (marked as f/4), and the frequency of the third reference signal REF3 is an eighth of the frequency of the clock signal CLK (marked as f/8).

Figure 5:
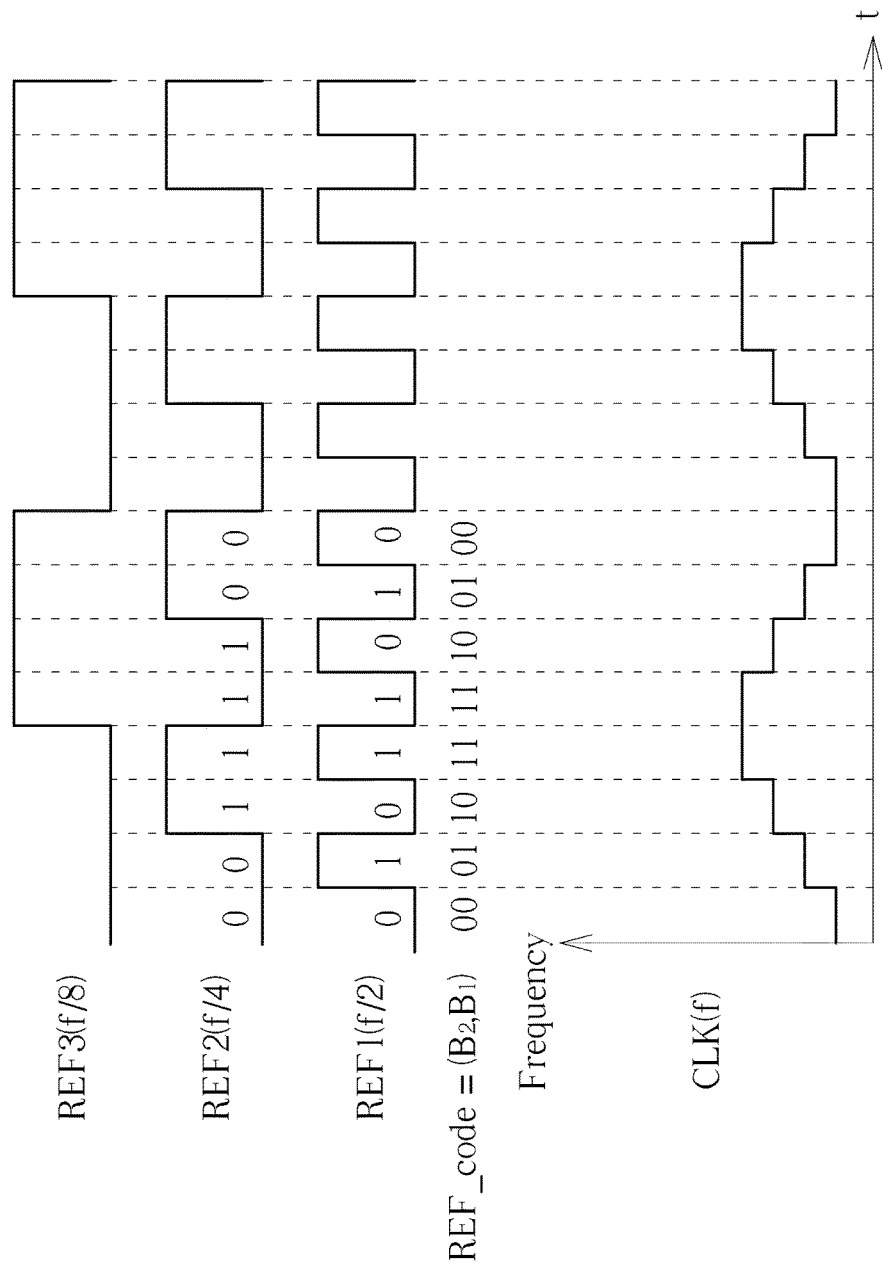
FIG. 5 is a diagram illustrating a reference signal comprising a first reference signal, a second reference signal and a third reference signal, and the clock signal frequency according to an embodiment of the present invention.

Refer to FIG. 5 in conjunction with FIGS. 2 and 3. FIG. 5 is a diagram illustrating the reference signal REF comprising the first reference signal REF1, the second reference signal REF2 and the third reference signal REF3, and the clock signal frequency, according to an embodiment of the present invention. As shown in FIG. 5, the first reference signal REF1 being half the frequency of the clock signal CLK and the second reference signal REF2 being a quarter of the frequency of the clock signal CLK are decoded by the decoder 210 shown in FIG. 2 for generating the reference code REF_code composed of the bits B1 and B2. In a case where the third reference signal REF3 is logic 'low', when the first reference signal REF1 and the second reference signal REF2 are both logic 'low', the reference code REF_code will be generated as '00'. When the first reference signal REF1 is logic 'low' while the second reference signal REF2 is logic 'high', the reference code REF_code will be generated as '01'. When the first reference signal REF1 is logic 'high' while the second reference signal REF2 is logic 'low', the reference code REF_code will be generated as '10'. when the first reference signal REF1 and the second reference signal REF2 are both logic 'high', the reference code REF_code will be generated as '11'. In a case where the third reference signal REF3 is logic 'high', the reference code REF_code generated by the decoder 210 will be inverted. For example, when the third reference signal REF3 is logic 'high', and the first reference signal REF1 and the second reference signal REF2 are both logic 'low', the reference code REF_code will be generated as '11', and so on. As mentioned above, the frequency of the clock signal CLK is determined by the reference code REF_code. Therefore, when the reference code REF_code is varied periodically and repeatedly, the frequency of the clock signal will also be varied periodically and repeatedly, as shown in FIG. 5.

It should be noted that, in this embodiment, the frequency of the clock signal is varied periodically and repeatedly as a sawtooth curve; however, in other embodiments, the frequency of the clock signal has periodically and repeatedly curves, e.g., a ramp curve, or a step-wise continuous sinusoidal curve.

Figure 6:
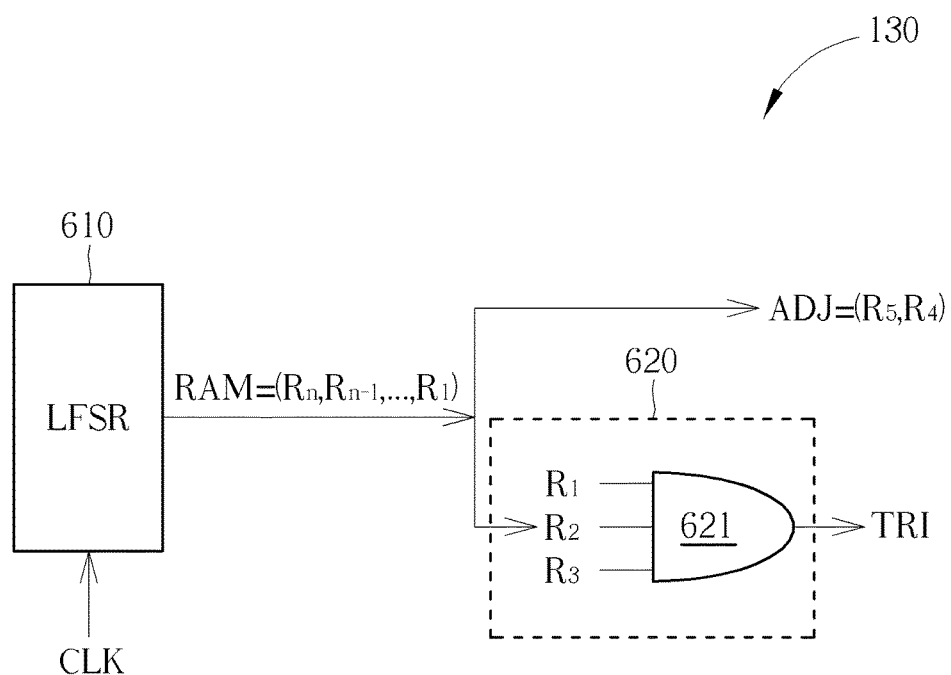
FIG. 6 is a diagram illustrating an adjusting circuit of the clock generating circuit according to an embodiment of the present invention.

FIG. 6 is a diagram illustrating the adjusting circuit 130 of the clock generating circuit 10 according to an embodiment of the present invention. As shown in FIG. 6, the adjusting circuit 130 comprises a random signal generating circuit 610 and a logic circuit 620. The random signal generating circuit 610 is arranged to generate a random signal RAM comprising a plurality of bits $R_1, R_2, \ldots R_n$, wherein the adjusting signal is generated according to a first part of the plurality of bits $R_1, R_2, \ldots R_n$ of the random signal RAM and the trigger signal TRI is generated according to a second part of the plurality of bits $R_1, R_2, \ldots R_n$ of the random signal RAM. In this embodiment, the random signal generating circuit 610 is implemented by a linear feedback shift register (LFSR) for randomly generating the random signal RAM according to the clock signal CLK. Those skilled in the art should readily understand other implementations of a random signal generating circuit. In this embodiment, the adjusting signal ADJ is directly extracted from the first part of the plurality of bits $R_1, R_2, \ldots R_n$. As mentioned above, the adjusting code ADJ_code comprises only two bits; therefore, the adjusting signal ADJ is extracted from two of the plurality of bits $R_1, R_2, \ldots R_n$. For example, the bits $(R_5, R_4)$ shown in FIG. 6 are outputted as the adjusting signal ADJ. The logic circuit 620 is arranged to generate the trigger signal TRI according to the second part of the plurality of bits $R_1, R_2, \ldots R_n$ of the random signal RAM. In this embodiment, the second part of the plurality of $R_1, R_2, \ldots R_n$ comprises the bits $(R_3, R_2, R_1)$ (this is only for illustrative purposes and not a limitation of the present invention). As shown in FIG. 6, the logic circuit 620 comprises an ADD gate 621 for receiving the bits $(R_3, R_2, R_1)$ as inputs to generate the trigger signal TRI. When the bits $(R_3, R_2, R_1)$ are all logic 'high', the trigger signal TRI is the specific value (i.e. logic 'high') for triggering the decoder 210 to decode the adjusting signal ADJ in order to generate the adjusting code ADJ_code. It should be noted that, in this embodiment, the logic circuit 620 is implemented by the ADD gate 621 for receiving the bits $(R_3, R_2, R_1)$; however, the goal of the trigger signal TRI is only for randomly determining whether the frequency of the clock signal CLK should be adjusted according to the adjusting signal ADJ. The logic circuit 620 can be implemented by different logic gates and receive more or less than three bits from the plurality of bits $R_1, R_2, \ldots R_n$. Likewise, based on the implementation of the logic circuit 620, the specific value of the trigger signal TRI is not limited to be logic 'high'. For example, the logic circuit 620 can be implemented by a NAND gate. When the bits $(R_3, R_2, R_1)$ are all logic 'high', the trigger signal TRI has the specific value (i.e. logic 'low'). In another example, the logic circuit 620 can be implemented by a buffer for receiving only one bit (e.g. the bit $R_3$) from the plurality of bits $R_1, R_2, \ldots R_n$ and outputting the bit $R_3$ as the trigger signal TRI. The decoder 210 will be triggered when the trigger signal TRI is logic 'low'. In other words, the implementation of the logic circuit 620 and the number of bits received by the logic circuit 620 are not limitations of the present invention.

Figure 7:
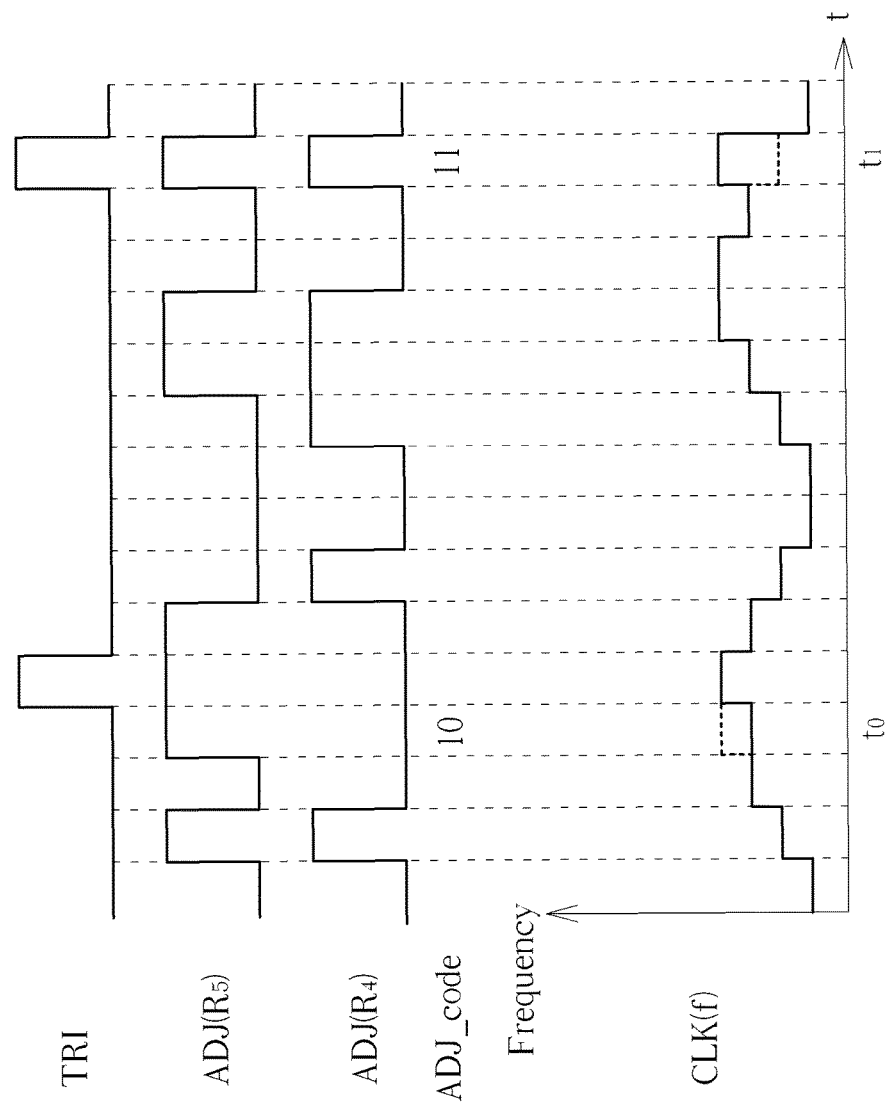
FIG. 7 is a diagram illustrating an adjusting signal and a trigger signal generated by the adjusting circuit according to an embodiment of the present invention.

FIG. 7 is a diagram illustrating the adjusting signal ADJ and the trigger signal TRI generated by the adjusting circuit 130 according to an embodiment of the present invention. As shown in FIG. 7, the trigger signal has the specific value (assume the specific value is set to be the logic 'high'), at the time points $t_0$ and $t_1$, for example. At the time point $t_0$, the decoder 210 is triggered by the trigger signal TRI and receives the adjusting signal ADJ comprising the bits $(R_5, R_4)$, and decodes the adjusting signal ADJ to generate the adjusting code ADJ_code (whose bits value is '10') to the digital controlled voltage generating circuit 220. The frequency of the clock signal CLK is adjusted according to the adjusting code ADJ_code at the time point $t_1$ as shown in FIG. 7. Likewise, at the time point $t_1$, the decoder 210 is triggered by the trigger signal TRI and receives the adjusting signal ADJ comprising the bits $(R_5, R_4)$, and decodes the adjusting signal ADJ to generate the adjusting code ADJ_code (whose bits value is '11') to the digital controlled voltage generating circuit 220. The frequency of the clock signal CLK is adjusted according to the adjusting code ADJ_code at the time point $t_0$ as shown in FIG. 7.

By referring to the reference signal REF, the frequency of the clock signal CLK is varied repeatedly and periodically. Furthermore, by randomly generating the adjusting signal ADJ and the trigger signal TRI, the frequency of the clock signal CLK can also be adjusted randomly. In this way, the Electromagnetic Interference (EMI) in response to the clock signal CLK can be effectively reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A clock generating circuit, comprising:
   a generating circuit, arranged to generate a clock signal;
   a reference circuit, coupled to the generating circuit, wherein the reference circuit is arranged to generate a reference signal to the generating circuit according to the clock signal, wherein a frequency of the clock signal is varied according to the reference signal when the reference signal is received by the generating circuit; and
   an adjusting circuit, arranged to generate an adjusting signal and a trigger signal to the generating circuit, wherein the generating circuit refers to the trigger signal to decide whether to adjust the frequency of the clock signal according to the adjusting signal.

2. The clock generating circuit of claim 1, wherein the frequency of the clock signal is adjusted by the generating circuit according to the adjusting signal when the trigger signal is a specific value, and the frequency of the clock signal is not adjusted by the generating circuit according to the adjusting signal when the trigger signal is not the specific value.

3. The clock generating circuit of claim 2, wherein the adjusting circuit comprises:
   a random signal generating circuit, arranged to generate a random signal comprising a plurality of bits, wherein the adjusting signal is generated according to a first part of the plurality of bits of the random signal.

4. The clock generating circuit of claim 3, wherein the random signal generating circuit is a linear feedback shift register (LFSR).

5. The clock generating circuit of claim 3, wherein the adjusting circuit further comprises:
   a logic circuit, arranged to generate the trigger signal according to a second part of the plurality of bits of the random signal.

6. The clock generating circuit of claim 5, wherein the logic circuit is an AND gate.

7. The clock generating circuit of claim 1, wherein the reference circuit comprises:
   a frequency dividing circuit, arranged to perform a frequency division on the clock signal to generate the reference signal.

8. The clock generating circuit of claim 7, wherein the reference signal generated by the frequency dividing circuit comprises at least a first signal and a second signal, and a frequency of the first signal is half the frequency of the clock signal while a frequency of the second signal is a quarter of the frequency of the clock signal.

9. The clock generating circuit of claim 8, wherein the generating circuit comprises:
   a decoder, arranged to decode the reference signal to generate a reference digital code, wherein the reference digital code varies repeatedly and sequentially;
   a digital controlled voltage generating circuit, arranged to receive the reference digital code to generate a digital controlled voltage, wherein a voltage value of the digital controlled voltage varies repeatedly and sequentially according to the reference digital code; and
   a comparing circuit, arranged to compare the digital controlled voltage with a first reference voltage and a second reference voltage to generate the clock signal, wherein the frequency of the clock signal varies repeatedly and sequentially according to the digital controlled voltage.

10. A clock generating method, comprising:
    generating a reference signal according to a clock signal, wherein a frequency of the clock signal is varied according to the reference signal;
    generating an adjusting signal and a trigger signal; and
    referring to the trigger signal to decide whether to adjust the frequency of the clock signal according to the adjusting signal.

11. The clock generating method of claim 10, further comprising:
    adjusting the frequency of the clock signal according to the adjusting signal when the trigger signal is a specific value;
    wherein the frequency of the clock signal is not adjusted according to the adjusting signal when the trigger signal is not the specific value.

12. The clock generating method of claim 11, further comprising: performing a random signal generation to generate a random signal comprising a plurality of bits, wherein the adjusting signal is generated according to a first part of the plurality of bits of the random signal.

13. The clock generating method of claim 12, wherein the random signal generation is performed by a linear feedback shift register (LFSR).

14. The clock generating method of claim 12, further comprising:
    performing a logic operation to generate the trigger signal according to a second part of the plurality of bits of the random signal.

15. The clock generating method of claim 10, wherein the logic operation is an AND operation.

16. The clock generating method of claim 10, further comprising:
    performing a frequency division on the clock signal to generate the reference signal.

17. The clock generating method of claim 16, wherein the reference signal generated by the frequency division comprises at least a first signal and a second signal, and a frequency of the first signal is half the frequency of the clock signal while a frequency of the second signal is a quarter of the frequency of the clock signal.

18. The clock generating method of claim 17, further comprising:
    decoding the reference signal to generate a reference digital code, wherein the reference digital code varies repeatedly and sequentially;
    receiving the reference digital code to generate a digital controlled voltage, wherein a voltage value of the digital controlled voltage varies repeatedly and sequentially according to the reference digital code; and
    comparing the digital controlled voltage with a first reference voltage and a second reference to generate the clock signal, wherein the frequency of the clock signal varies repeatedly and sequentially according to the digital controlled voltage.

* * * * *